US 7,167,183 B1

(12) United States Patent
Donovan et al.

(10) Patent No.: US 7,167,183 B1
(45) Date of Patent: Jan. 23, 2007

(54) REORGANIZED ANISOTROPIC SAMPLING ORDER

(75) Inventors: Walter E. Donovan, Saratoga, CA (US); Anders M. Kugler, Sunnyvale, CA (US); William P. Newhall, Jr., San Francisco, CA (US); Paul S. Heckbert, Pittsburgh, PA (US)

(73) Assignee: NVIDIA Corporation, Santa Clara, CA (US)

( * ) Notice: Subject to any disclaimer, the term of this patent is extended or adjusted under 35 U.S.C. 154(b) by 135 days.

(21) Appl. No.: 10/965,069

(22) Filed: Oct. 14, 2004

(51) Int. Cl.
*G09G 5/00* (2006.01)
(52) U.S. Cl. .................................... 345/582
(58) Field of Classification Search ............... None
See application file for complete search history.

(56) References Cited

U.S. PATENT DOCUMENTS

| 5,821,944 | A | * | 10/1998 | Watkins | 345/582 |
| 6,040,837 | A | | 3/2000 | Wong et al. | |
| 6,724,395 | B1 | * | 4/2004 | Treichler | 345/582 |
| 2004/0257376 | A1 | * | 12/2004 | Liao et al. | 345/587 |

OTHER PUBLICATIONS

Barkans, Anthony C., "High Quality Rendering Using the Talisman Architecture," SIGGRAPH/Eurographics Workshop, 1997.
"Anisotropic Texture Filtering," Meltdown Feb. 1998 Prerelease, Direct3D Reference Rasterizer.
Talisman 3D Technology Briefing, Talisman Graphics & Multimedia System.
McCormack, Joe, et al., "Feline: Fast Elliptical Lines for Anisotropic Texture Mapping," Mitsubishi Electric Information Technology Center America, 2000.
Greene, Ned, et al., "Creating Raster Omnimax Images from Multiple Perspective Views Using the Elliptical Weighted Average Filter," IEEE Computer Graphics and Applications, vol. 6, Issue 6, pp. 21-27, Jun. 1986.
Williams, Lance, "Pyramidal Parametrics," Computer Graphics, vol. 17, No. 3, Jul. 1983.
Heckbert, Paul S., "Fundamentals of Texture Mapping and Image Warping," *Master's Thesis*, Dept. of Electrical Engineering and Computer Science, Univeristy of California, Berkeley, CA, Jun. 17, 1989.
"ATI's Optimized Texture Filtering Called Into Question," Tom's Hardware Guide, Dec. 17, 2004. <http://www20.graphics.tomshardware.com/graphic/20040603/index.html>.
Heckbert, Paul, "Texture Mapping Polygons In Perspective," Computer Graphics Lab, New York Institute of Technology, Technical Memo No. 13, Apr. 28, 1983.

* cited by examiner

*Primary Examiner*—Mark Zimmerman
*Assistant Examiner*—Kevin Xu
(74) *Attorney, Agent, or Firm*—Patterson & Sheridan, L.L.P.

(57) ABSTRACT

The current invention involves new systems and methods for reorganizing a texture sampling order that is used to read texels from a texel cache. When anisotropic filtering is used to process the texels read from the texel cache, the texels are read in an order based on a major axis alignment. Reorganizing texture sampling order to use the order based on the major axis alignment results in improved texel cache locality, thereby improving texel cache performance.

21 Claims, 11 Drawing Sheets

REORGANIZED ANISOTROPIC SAMPLING ORDER

FIELD OF THE INVENTION

One or more aspects of the invention generally relate to computer graphics, and more particularly to reading texture map data.

BACKGROUND

Conventional graphics processors are exemplified by systems and methods developed to read and filter texture map sample texels. To simplify texture map filtering performed within a graphics processor, a texture is prefiltered and various resolutions of the prefiltered texture are stored as mip mapped texture maps. Classic mip maps are isotropically filtered, i.e. filtered symmetrically in the horizontal and vertical directions using a square filter pattern. Isotropically filtered mip maps result in high quality images for surfaces when major and minor axes of pixel footprints in texture space are similar in length. However, when an isotropically filtered texture is applied to a receding surface viewed "on edge", aliasing artifacts (blurring) become apparent to a viewer as the texture is effectively "stretched" in one dimension, along the major axis of anisotropy, as the texture is applied to the surface.

In general, producing a higher-quality image, such as an image produced using anisotropic filtering, requires reading and processing more texels to produce each filtered result. When a cache is used to improve texel read performance, more cache lines are needed to read the texels as the anisotropic ratio increases. Therefore, texture filtering performance decreases as the anisotropic ratio increases and the number of cache lines that needed to be read exceeds the number of cache lines that can be read for a particular cache implementation. Additional clock cycles are required to read texels needed to produce an anisotropically filtered result for a pixel.

Accordingly, there is a need to improve texel read performance for high anisotropic ratios when a texel cache is used.

SUMMARY

The current invention involves new systems and methods for reorganizing a texture sampling order used to read texels when anisotropic filtering is used. Texel read performance is improved for high anisotropic ratios by reorganizing texel reads when a texel cache is used. The texel reads are ordered based on a major axis alignment.

Various embodiments of a method of the invention for reorganizing texture sampling order for anisotropic texture map filtering, including determining a major axis alignment for an anisotropic footprint, determining a texture sampling order for texels based on the major axis alignment, reading the texels from a texel cache based on the texture sampling order, and filtering the texels to produce an anisotropically filtered result for a pixel.

Various embodiments of the invention include a texture unit for determining a texture sampling order for anisotropic texture filtering. The texture unit includes a derivative computation unit configured to compute a major axis alignment and an anisotropic ratio for an anisotropic footprint, a sample location unit configured to produce a number of sample locations and weights for texture samples based on the anisotropic ratio, and an ordering unit configured to determine the texture sampling order for reading texels based on the major axis alignment.

BRIEF DESCRIPTION OF THE VARIOUS VIEWS OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

FIG. 1 is a block diagram of an exemplary embodiment of a respective computer system in accordance with one or more aspects of the present invention including a host computer and a graphics subsystem.

FIGS. 2A, 2B, 2C, and 2D are conceptual diagrams showing an anisotropic pixel footprint.

FIGS. 3B, 3C, 3D, and 3E illustrate embodiments of a method of ordering reads of texels for use in an anisotropic texture map filtering computation in accordance with one or more aspects of the present invention.

Figure 3A:
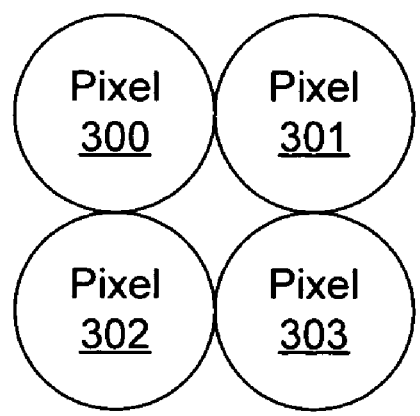
FIG. 3A illustrates an arrangement of four pixels in accordance with one or more aspects of the present invention.
Figure 3B:
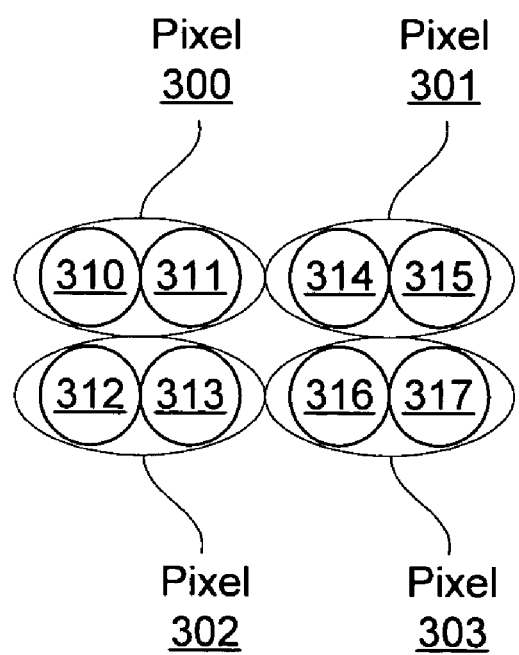
Figure 3C:
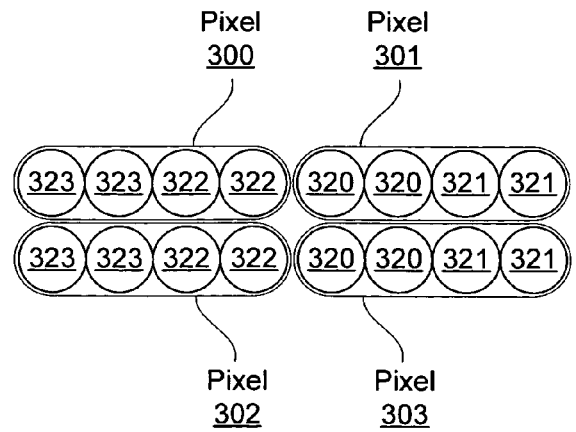
Figure 3D:
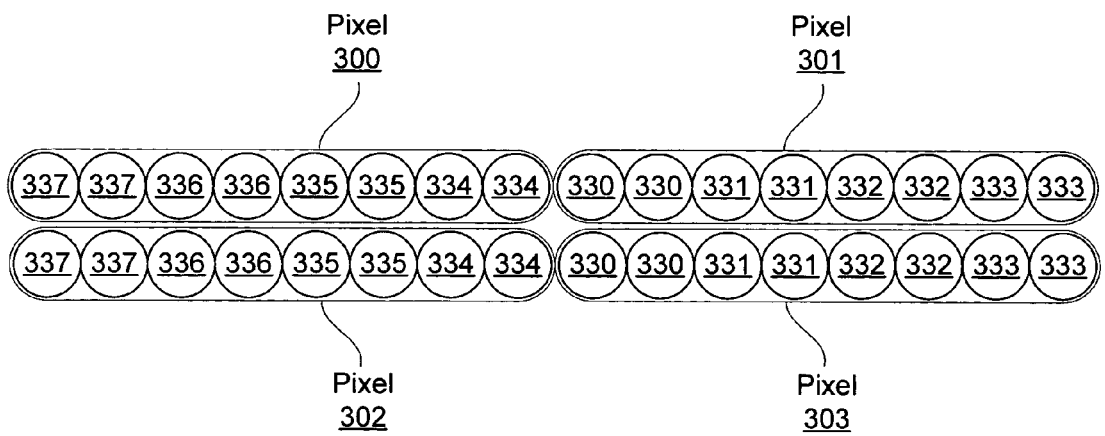
Figure 3E:
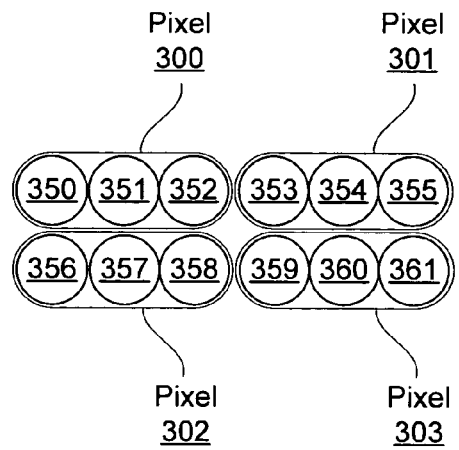
Figure 3F:
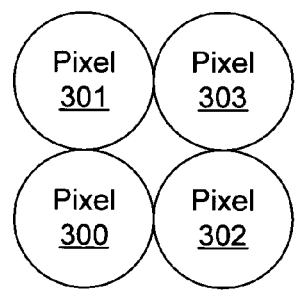

FIG. 3F illustrates another arrangement of four pixels in accordance with one or more aspects of the present invention.

Figure 3G:
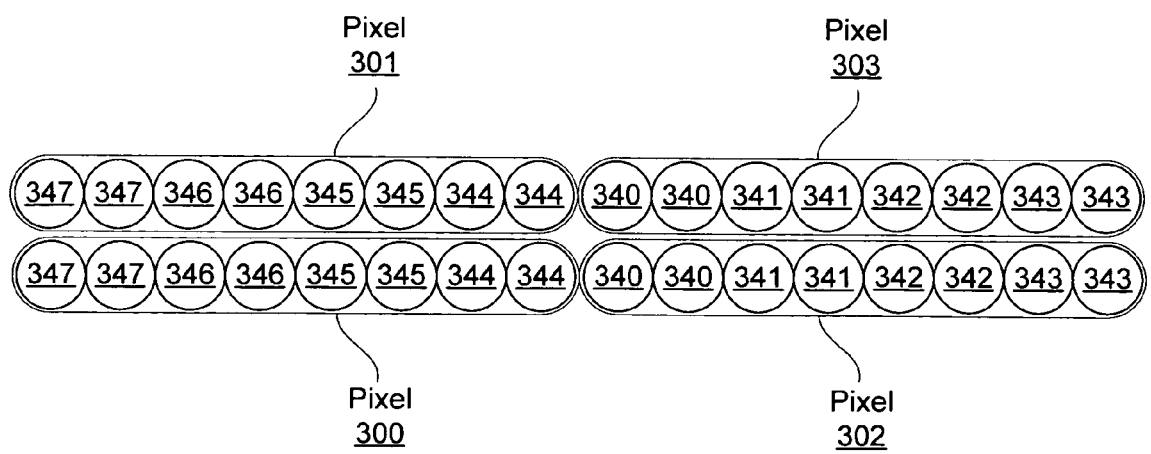

FIG. 3G illustrates another embodiment of a method of ordering reads of texels for use in an anisotropic texture map filtering computation in accordance with one or more aspects of the present invention.

Figure 4:
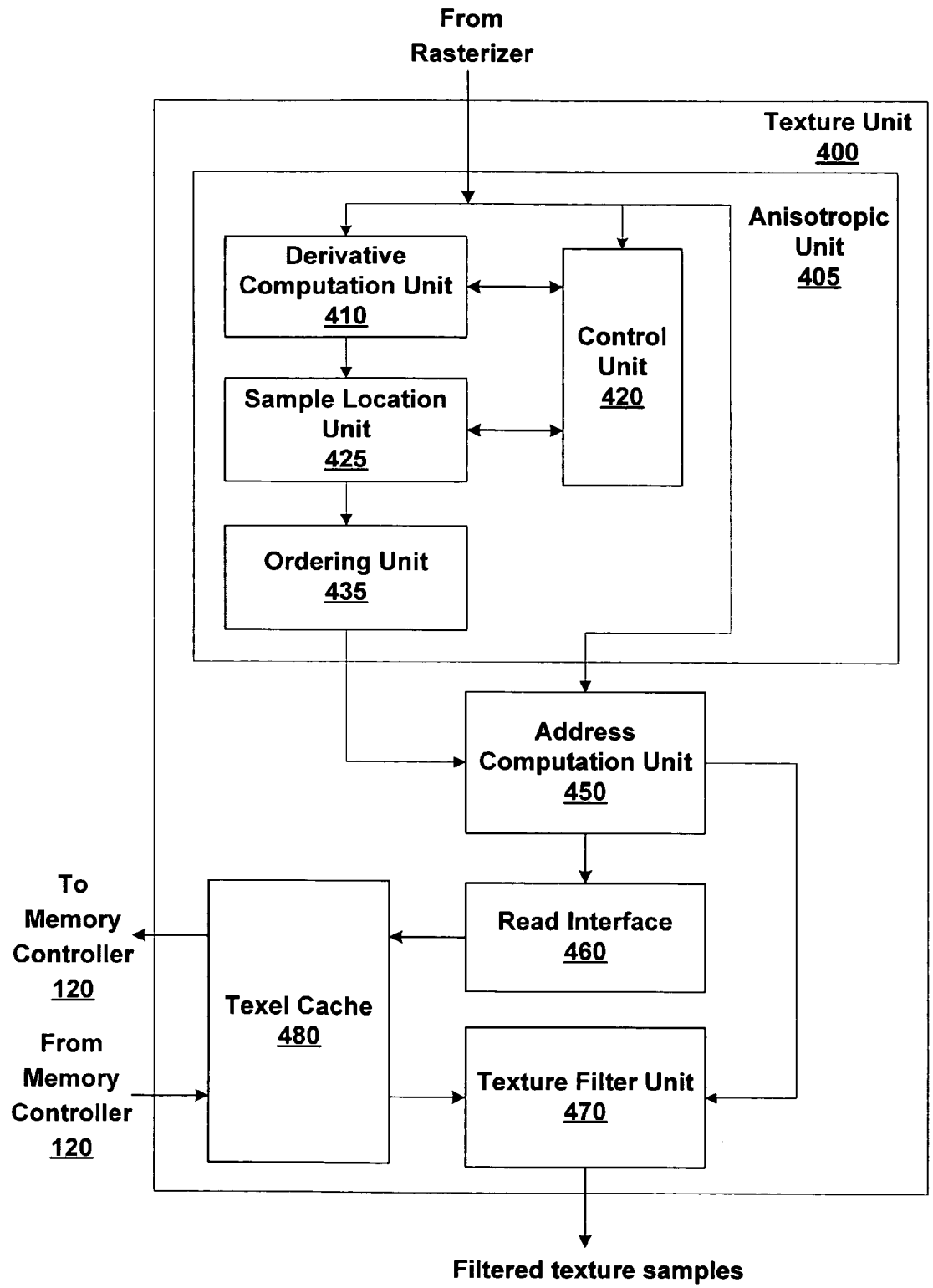

FIG. 4 is a block diagram of a texture unit in accordance with one or more aspects of the present invention.

Figure 5:
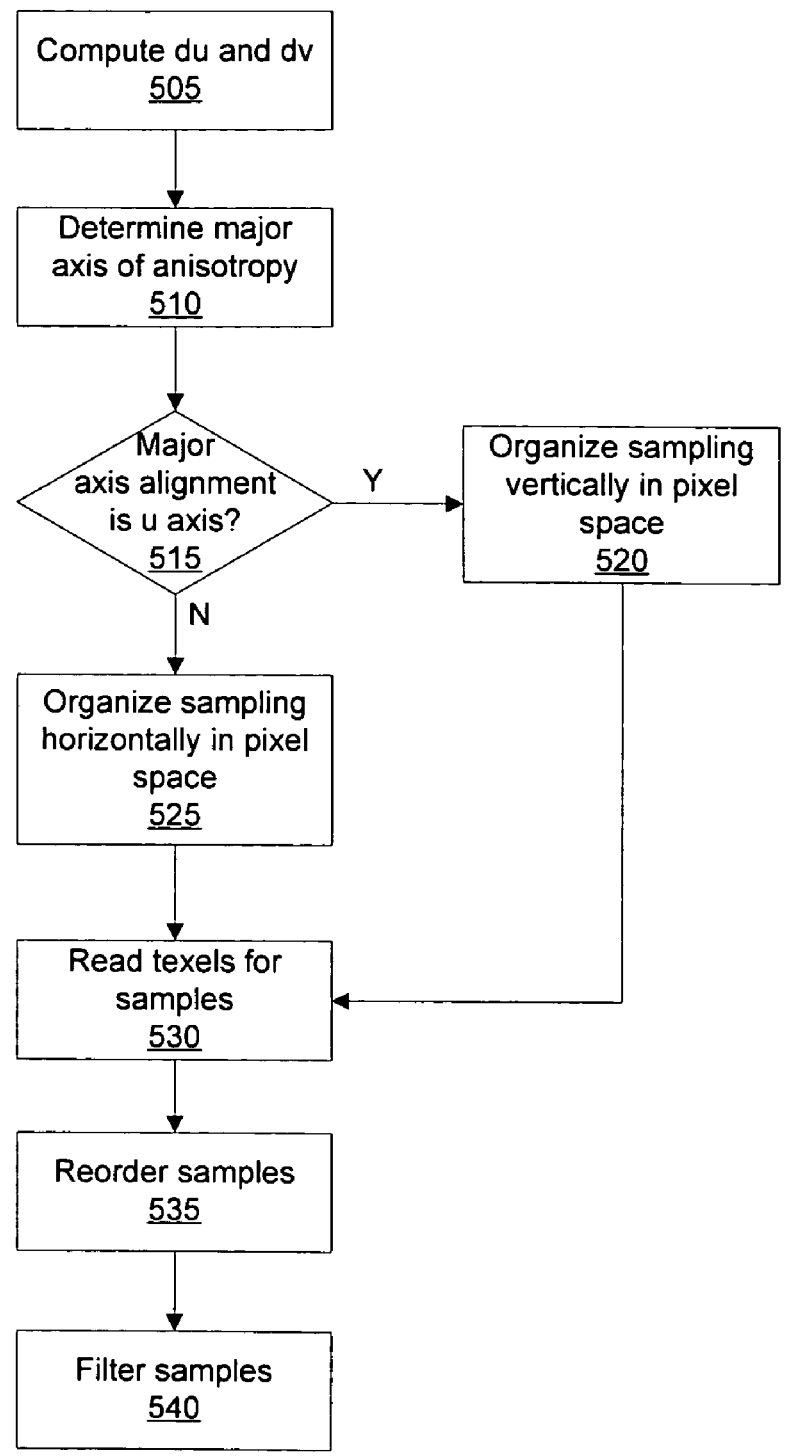

FIG. 5 illustrates an embodiment of a method of reordering reads of texels for use in an anisotropic texture map filtering computation in accordance with one or more aspects of the present invention.

Figure 6A:
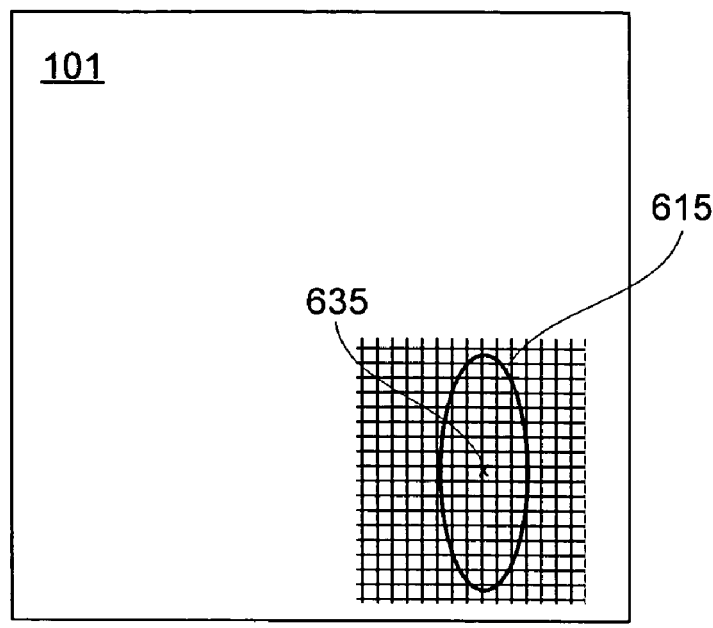
Figure 6B:
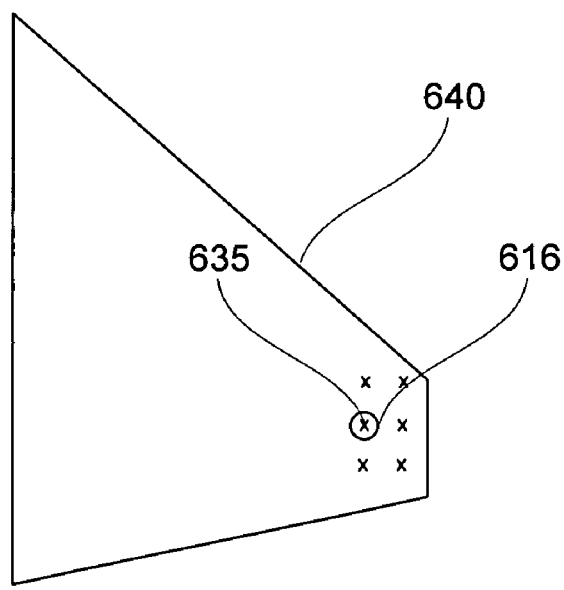
Figure 6C:
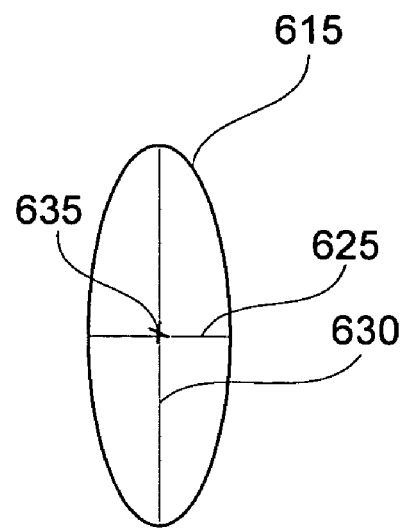

FIGS. 6A, 6B, and 6C are other conceptual diagrams showing an anisotropic pixel footprint.

Figure 6D:
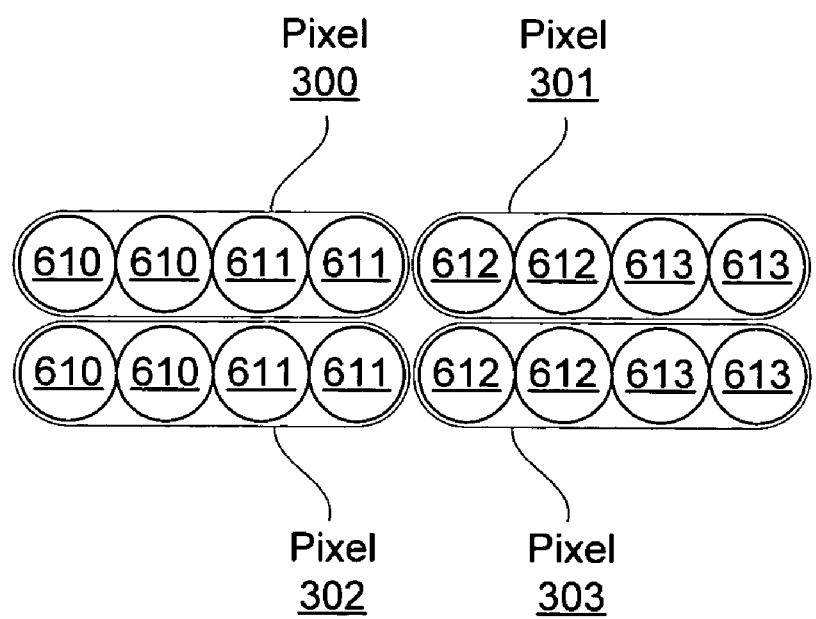

FIG. 6D illustrates another embodiment of a method of ordering reads of texels for use in an anisotropic texture map filtering computation in accordance with one or more aspects of the present invention.

Figure 7:
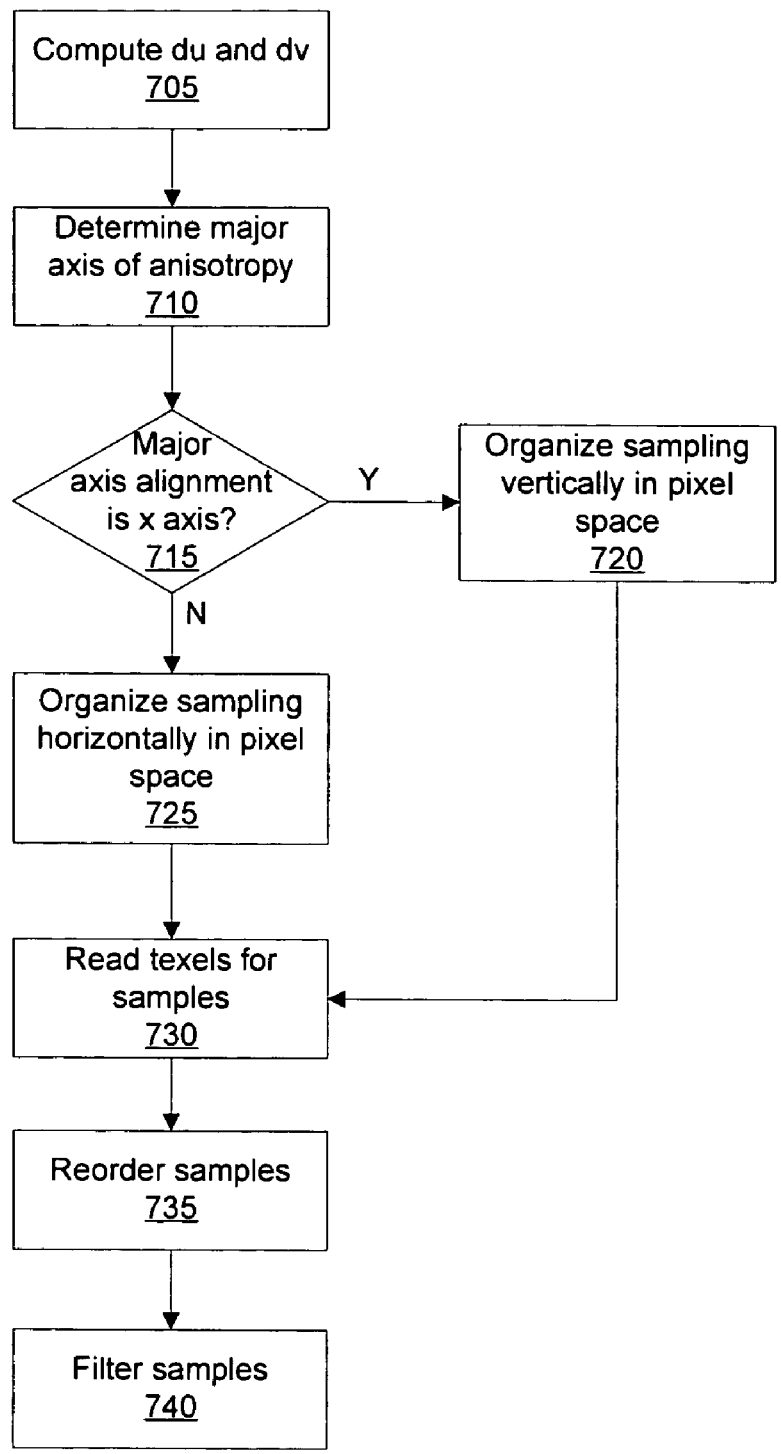

FIG. 7 illustrates another embodiment of a method of reordering reads of texels for use in an anisotropic texture map filtering computation in accordance with one or more aspects of the present invention.

DISCLOSURE OF THE INVENTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
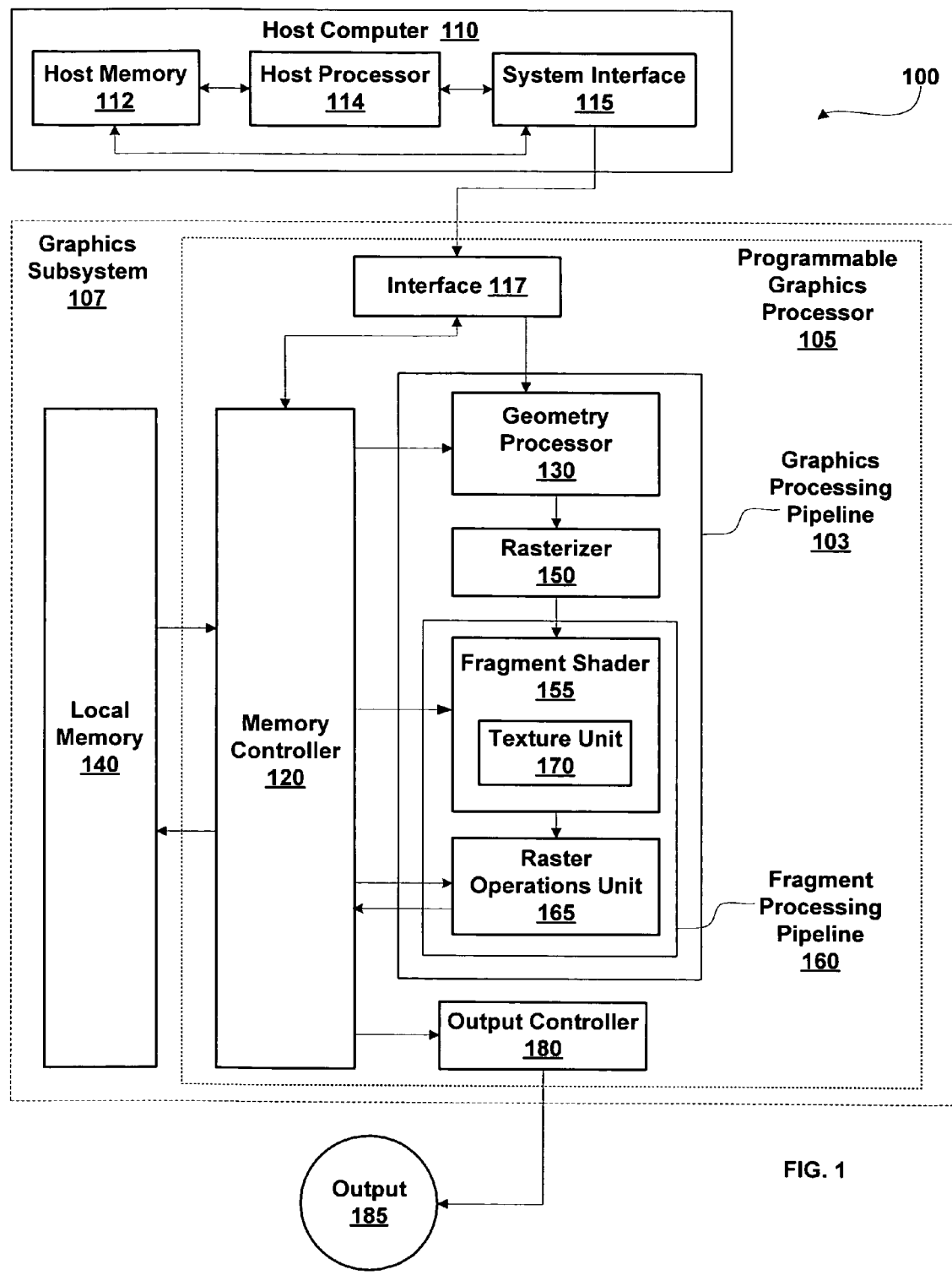

FIG. 1 is a block diagram of an exemplary embodiment of a Computing System generally designated 100 and including a Host Computer 110 and a Graphics Subsystem 107 including an embodiment of Texture Unit 400. Computing System 100 may be a desktop computer, server, laptop computer, palm-sized computer, tablet computer, game console, portable wireless terminal such as a PDA or cellular telephone, computer based simulator, or the like. Host computer 110 includes Host Processor 114 that may include a system memory controller to interface directly to Host Memory 112 or may communicate with Host Memory 112 through a System Interface 115. System Interface 115 may be an I/O (input/output) interface or a bridge device including the system memory controller to interface directly to Host Memory 112. An example of System Interface 115 known in the art includes Intel® Northbridge.

Host computer 110 communicates with Graphics Subsystem 107 via System Interface 115 and an Interface 117. Graphics Subsystem 107 includes a Local Memory 140 and a Programmable Graphics Processor 105. Programmable Graphics Processor 105 uses memory to store graphics data, including texture maps, and program instructions, where graphics data is any data that is input to or output from computation units within Programmable Graphics Processor 105. Graphics memory is any memory used to store graphics data or program instructions to be executed by Programmable Graphics Processor 105. Graphics memory can include portions of Host Memory 112, Local Memory 140 directly coupled to Programmable Graphics Processor 105, storage resources coupled to the computation units within Programmable Graphics Processor 105, and the like. Storage resources can include register files, caches, FIFOs (first in first out memories), and the like.

In addition to Interface 117, Programmable Graphics Processor 105 includes a Graphics Processing Pipeline 103, a Memory Controller 120 and an Output Controller 180. Data and program instructions received at Interface 117 can be passed to a Geometry Processor 130 within Graphics Processing Pipeline 103 or written to Local Memory 140 through Memory Controller 120. In addition to communicating with Local Memory 140, and Interface 117, Memory Controller 120 also communicates with Graphics Processing Pipeline 103 and Output Controller 180 through read and write interfaces in Graphics Processing Pipeline 103 and a read interface in Output Controller 180.

Within Graphics Processing Pipeline 103, Geometry Processor 130 and a programmable graphics fragment processing pipeline, Fragment Processing Pipeline 160, perform a variety of computational functions. Some of these functions are table lookup, scalar and vector addition, multiplication, division, coordinate-system mapping, calculation of vector normals, tessellation, calculation of derivatives, interpolation, and the like. Geometry Processor 130 and Fragment Processing Pipeline 160 are optionally configured such that data processing operations are performed in multiple passes through Graphics Processing Pipeline 103 or in multiple passes through Fragment Processing Pipeline 160. Each pass through Programmable Graphics Processor 105, Graphics Processing Pipeline 103 or Fragment Processing Pipeline 160 concludes with optional processing by a Raster Operations Unit 165.

Vertex programs are sequences of vertex program instructions compiled by Host Processor 114 for execution within Geometry Processor 130 and Rasterizer 150. Shader programs are sequences of shader program instructions compiled by Host Processor 114 for execution within Fragment Processing Pipeline 160. Geometry Processor 130 receives a stream of program instructions (vertex program instructions and shader program instructions) and data from Interface 117 or Memory Controller 120, and performs vector floating-point operations or other processing operations using the data. The program instructions configure subunits within Geometry Processor 130, Rasterizer 150 and Fragment Processing Pipeline 160. The program instructions and data are stored in graphics memory, e.g., portions of Host Memory 112, Local Memory 140, or storage resources within Programmable Graphics Processor 105. When a portion of Host Memory 112 is used to store program instructions and data the portion of Host Memory 112 can be uncached so as to increase performance of access by Programmable Graphics Processor 105. Alternatively, configuration information is written to registers within Geometry Processor 130, Rasterizer 150 and Fragment Processing Pipeline 160 using program instructions, encoded with the data, or the like.

Data processed by Geometry Processor 130 and program instructions are passed from Geometry Processor 130 to a Rasterizer 150. Rasterizer 150 is a sampling unit that processes primitives and generates sub-primitive data, such as fragment data, including parameters associated with fragments (texture IDs, texture coordinates, and the like). Rasterizer 150 converts the primitives into sub-primitive data by performing scan conversion on the data processed by Geometry Processor 130. Rasterizer 150 outputs fragment data and shader program instructions to Fragment Processing Pipeline 160.

The shader programs configure the Fragment Processing Pipeline 160 to process fragment data by specifying computations and computation precision. Fragment Shader 155 is optionally configured by shader program instructions such that fragment data processing operations are performed in multiple passes within Fragment Shader 155. Fragment Shader 155 includes an embodiment of a Texture Unit 400, further described in conjunction with FIG. 4. In one embodiment, in addition to reading texels, Texture Unit 400 is configured to read shader program instructions stored in Local Memory 140 or Host Memory 112 via Memory Controller 120.

In some embodiments of Computing System 100 graphics processing performance is limited by memory bandwidth, e.g. between Host Memory 112 and Programmable Graphics Processor 105, between Local Memory 140 and Graphics Processing Pipeline 103, and the like. In those embodiments using a texel cache to reduce the number of texels read from Local Memory 140 or Host Memory 112 may improve graphics processing performance.

Fragment Shader 155 outputs processed fragment data, e.g., color and depth, and codewords generated from shader program instructions to Raster Operations Unit 165. Raster Operations Unit 165 includes a read interface and a write interface to Memory Controller 120 through which Raster Operations Unit 165 accesses data stored in Local Memory 140 or Host Memory 112. Raster Operations Unit 165 optionally performs near and far plane clipping and raster operations, such as stencil, z test, blending, and the like, using the fragment data and pixel data stored in Local Memory 140 or Host Memory 112 at a pixel position (image location specified by x,y coordinates) associated with the processed fragment data. The output data from Raster Operations Unit 165 is written back to Local Memory 140 or Host Memory 112 at the pixel position associated with the output data and the results, e.g., image data are saved in graphics memory.

When processing is completed, an Output 185 of Graphics Subsystem 107 is provided using Output Controller 180. Alternatively, Host Processor 114 reads the image stored in Local Memory 140 through Memory Controller 120, Interface 117 and System Interface 115. Output Controller 180 is optionally configured by opcodes to deliver data to a display device, network, electronic control system, other Computing System 100, other Graphics Subsystem 107, or the like.

In conventional graphics processors a ratio value representing the ratio of the length of the minor axis to the length of the major axis, e.g. minor axis/major axis, is computed using a technique known to those skilled in the art. The ratio value, i.e., anisotropic ratio, is used to determine a number of texture samples to filter during anisotropic filtering to produce the filtered result. Each texture sample is produced by filtering one or more texels. The major axis and minor axis define a footprint that represents the projection of the pixel onto the texture map.

Figure 2A:
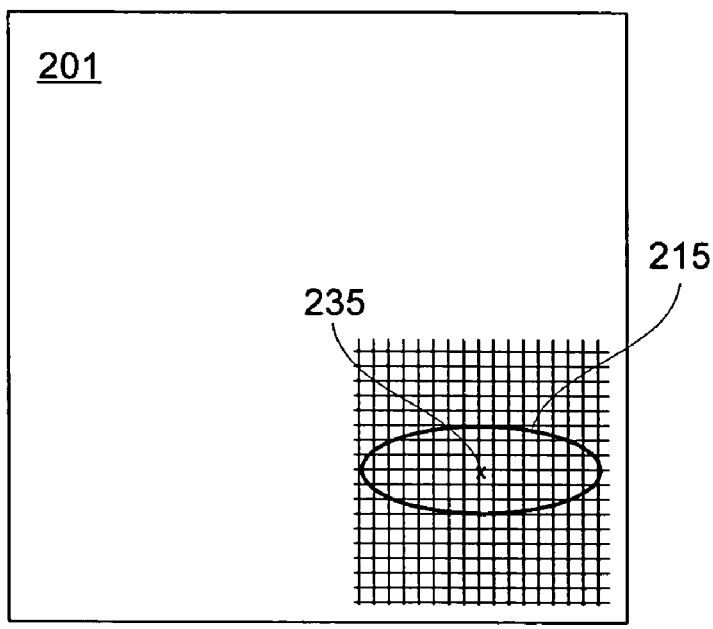
FIG. 2E illustrates anisotropic texture sampling along an axis for anisotropic filtering.
Figure 2B:
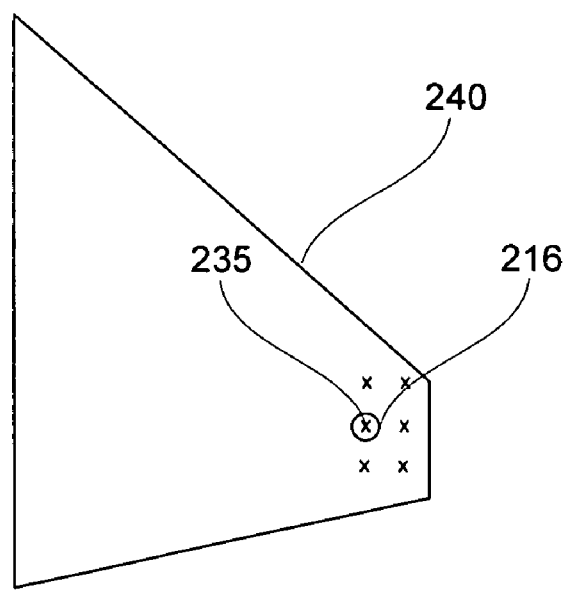

FIG. 2A is a conceptual diagram of a Texture Map 201. A Footprint 215 is a pixel footprint in texture space, with a Position 235 being the pixel center. FIG. 2B illustrates Texture Map 201 applied to pixels of a Surface 240 that is receding in image space. When viewed in image space, Footprint 215 (an ellipse) appears as Footprint 216 (a circle). Alternatively, Footprint 215 may appear as a quadrilateral and Footprint 216 may appear as a square. While isotropic filtering of texture samples within a pixel footprint that forms a circle in texture space results in a high-quality image, isotropic filtering of texture samples within a pixel footprint that forms an ellipse, such as Footprint 215, results in an image with aliasing artifacts. In contrast to isotropic filtering, anisotropic filtering uses a rectangular shaped filter pattern, resulting in fewer aliasing artifacts for footprints with major and minor axes that are not similar in length in texture space.

Figure 2C:
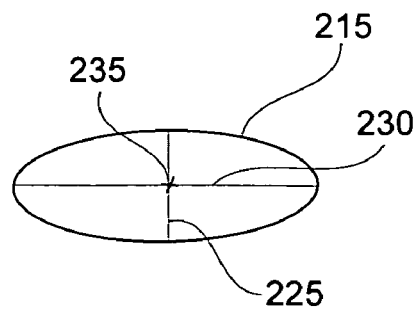
Figure 2D:
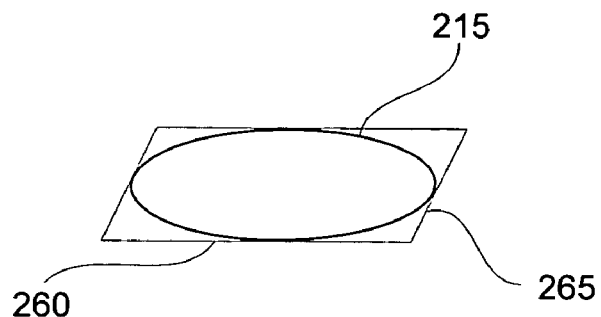

FIG. 2C illustrates Footprint 215 including a Minor Axis 225 that is significantly shorter than a Major Axis 230. Minor Axis 225 corresponds to the v texture coordinate axis and Major Axis 230 corresponds to the x texture coordinate axis. The x axis in pixel space is aligned with the u axis in texture space for Texture Map 201 applied to Surface 240. FIG. 2D illustrates Footprint 215 within a parallelogram. In some embodiments of the present invention, the length of Minor Axis 225 is computed as the length of Dimension 265 of the parallelogram. Likewise, the length of Major Axis 230 is computed as the length of Dimension 260 of the parallelogram. The sides of the parallelogram are determined by parameter derivatives, as described in conjunction with FIG. 3A.

Figure 2E:
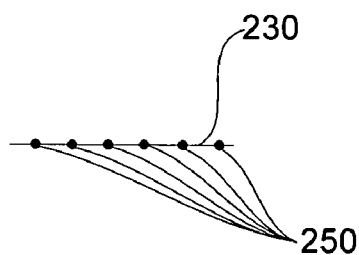

FIG. 2E illustrates an application of anisotropic filtering of Texture Samples 250 along Major Axis 230. Texture Samples 250 are anisotropically filtered to produce a filtered result. Classic anisotropic filtering filters up to 16 samples in a non-square pattern, compared with 1 sample when isotropic filtering is used. The number of texels read and processed for each sample may be 1, 4, or 8 depending on whether the texture sample is computed by point sampling, bilinearly filtering, or trilinearly filtering, respectively. Therefore, anisotropic filtering requires reading more texels than isotropic filtering. Furthermore, when a texel cache is used to improve performance of a texture unit within a graphics processor, reading more texels requires accessing more cache lines. Texel cache read locality may be improved by reorganizing cache read requests when two or more pixels are processed in parallel, i.e., when texels are read for texture samples within two or more pixels, as described further herein. Improving texel cache read locality may improve texture mapping performance.

FIG. 3A illustrates an arrangement of four pixels, a Pixel 300, a Pixel 301, a Pixel 302, and a Pixel 303, in accordance with one or more aspects of the present invention. Parameter derivative values such as du and dv relative to x and y, e.g., du/dx, dv/dx, du/dy, and dv/dy, may be computed for a pixel quad such as Pixels 300, 301, 302, and 303. Pixels 300 and 301 and Pixels 302 and 303 are aligned along the x axis in pixel space and Pixels 300 and 302 and Pixels 301 and 303 are vertically aligned, i.e., aligned along the y axis, in pixel space.

Specifically, du/dx and dv/dx are computed by subtracting the u and v parameters of Pixel 301 and Pixel 300. Likewise, du/dy and dv/dy are computed by subtracting the u and v parameters of Pixel 302 and Pixel 300. Alternatively, Pixels 302 and 303 may be used to compute du/dx and dv/dx and Pixels 301 and 303 may be used to compute du/dy and dv/dy. In other embodiments of the present invention, du/dx is computed as:

$$(u_{Pixel\ 301} - u_{Pixel300}) + (u_{Pixel303} - u_{Pixel302})/2$$

and du/dy is computed as:

$$(u_{Pixel\ 302} - u_{Pixel300}) + (u_{Pixel303} - u_{Pixel301})/2.$$

Likewise, in other embodiments of the present invention, dv/dx is computed as:

$$(v_{Pixel\ 301} - v_{Pixel300}) + (v_{Pixel303} - v_{Pixel302})/2$$

and du/dy is computed as:

$$(v_{Pixel\ 302} - v_{Pixel300}) + (v_{Pixel303} - v_{Pixel301})/2.$$

Those skilled in the art will recognize that other techniques may be used to compute the parameter derivative values.

The sides of a parallelogram representing an anisotropic footprint in texture space, where the footprint may be a parallelogram or an ellipse, are defined by a first and a second vector. The first vector is defined by derivative values du/dx and dv/dx and the second vector is defined by derivative values du/dy and dv/dy. The derivative values may be used to determine the locations of anisotropic samples for each of Pixel 300, 301, 302, and 303. The four pixels are generally processed in parallel, and thus the texture data, e.g., texels, required for these four pixels are also read and processed in parallel.

FIG. 3B illustrates an embodiment of a method of ordering reads of texels for texture samples for use in an anisotropic texture map filtering computation in accordance with one or more aspects of the present invention. The anisotropic ratio is used to determine the number of texture samples that are filtered to produce each filtered result. In FIG. 3B, the level of anisotropy is 2:1, so texels for two texture samples are read for each of Pixel 300, 301, 302, and 303. Texels for Texture Samples 310, 311, 312, 313, 314, 315, 316, and 317 may be read in the following order: texels for Texture Samples 310, 312, 314, and 316 in one clock cycle and texels for Texture Samples 311, 313, 315, and 317 in another clock cycle.

Note that Texture Samples 310 and 314 are not positioned as closely as Texture Sample 310 and either Texture Sample 311 or Texture Sample 312. Therefore, texel read performance may be improved by increasing the locality of texel reads by reorganizing the read order for the texels based on their corresponding texture samples. Specifically, in some embodiments of the present invention texels for Texture Samples 310, 311, 312, 313, 314, 315, 316, and 317 may be read in the following order: texels for Texture Samples 310, 312, 311, and 313 in one clock cycle and texels for Texture Samples 314, 316, 315, and 317 in another clock cycle. Instead of reading texels for one texture sample for each pixel, texels for two textures samples are read for two pixels during each clock cycle. Specifically, texels for groups of texture samples are read for a pair of pixels that are aligned with the minor axis of anisotropy in texture space, i.e., pixels that are aligned with the y axis in pixel space, such as Pixels 300 and 302 or Pixels 301 and 303. A group of texture samples may include a single texture sample, two texture samples, such as Texture Samples 310 and 311, or more texture samples.

When texels for each of Pixel 300, 301, 302, and 303 are stored in different cache lines within a texel cache, only two cache lines will be accessed for each clock cycle when texels for two texture samples are read for each of two pixels. In contrast, when texels for one sample are read for each of four pixels, four different cache lines are accessed for each clock cycle. Reordering the texel reads may significantly reduce the number of cache lines that are accessed. For example, texture samples for each pixel may access texels in 1 to 4 cache lines per clock cycle. Adjoining pixels will also access from 1 to 4 cache lines per clock cycle. Pixels that are further apart may not share any cache line accesses. Thus, reordering texel reads based on texture sample locality may result in an increase in shared cache line accesses, reducing the number of clock cycles needed to read the texels needed to produce each anisotropically filtered pixel.

For each particular embodiment of a texel cache, the number of cache lines that may be read during a single clock cycle is limited and the lower the number the less costly the texel cache is to manufacture and the faster the access time is. Therefore, it is desirable to minimize the number of cache lines accessed in a single clock cycle while still accessing the texels needed to produce filtered results. Note that the texture filtering performance may be improved while the filtered result is equal to the filtered result that is obtained without reordering the texel reads.

FIG. 3C illustrates another embodiment of a method of ordering reads of texels for texture samples for use in an anisotropic texture map filtering computation in accordance with one or more aspects of the present invention. In FIG. 3C, the level of anisotropy is 4:1, so texels for four texture samples are read for each of Pixel 300, 301, 302, and 303. In one embodiment of the present invention, texels for pairs of groups of Texture Samples 323, 322, 320, and 321 are read starting at one end of the major axis of anisotropy in texture space and ending at the opposing end of the major axis of anisotropy. Specifically, texels for Texture Samples 323, 322, 320, and 321 are read in the following order: texels for Texture Samples 323 in a first clock cycle, texels for Texture Samples 322 in a second clock cycle, texels for Texture Samples 320 in a third clock cycle, and texels for Texture Samples 321 in a fourth clock cycle. In another embodiment of the present invention, texels for pairs of groups of Texture Samples 323, 322, 320, and 321 are read starting from the center of the major axis of anisotropy in texture space to one end of the major axis of anisotropy, returning to the center and ending at the opposing end of the major axis of anisotropy. Specifically, texels for Texture Samples 323, 322, 320, and 321 are read in the following order: texels for Texture Samples 320 in a first clock cycle, texels for Texture Samples 321 in a second clock cycle, texels for Texture Samples 322 in a third clock cycle, and texels for Texture Samples 323 in a fourth clock cycle. In alternate embodiments of the present invention, texels for a smaller or larger number of texture samples are read during a single clock cycle, dependent on the number of read ports on the texel cache.

FIG. 3D illustrates another embodiment of a method of ordering texel reads for texture samples for use in an anisotropic texture map filtering computation in accordance with one or more aspects of the present invention. In FIG. 3D, the level of anisotropy is 8:1, so texels for eight texture samples are read for each of Pixel 300, 301, 302, and 303. In one embodiment of the present invention, texels for pairs of groups of Texture Samples 337, 336, 335, 334, 333, 332, 331, and 330 are read starting at one end of the major axis of anisotropy in texture space and ending at the opposing end of the major axis of anisotropy. Specifically, texels for Texture Samples 337, 336, 335, 334, 333, 332, 331, and 330 are read in the following order: texels for Texture Samples 337 in a first clock cycle, texels for Texture Samples 336 in a second clock cycle, texels for Texture Samples 335 in a third clock cycle, texels for Texture Samples 334 in a fourth clock cycle, texels for Texture Samples 333 in a fifth clock cycle, texels for Texture Samples 332 in a sixth clock cycle, texels for Texture Samples 331 in a seventh clock cycle, and texels for Texture Samples 330 in an eighth clock cycle.

In another embodiment of the present invention, texels for pairs of groups of Texture Samples 337, 336, 335, 334, 333, 332, 331, and 330 are read starting from the center of the major axis of anisotropy in texture space to one end of the major axis of anisotropy, returning to the center and ending at the opposing end of the major axis of anisotropy. Specifically, texels for Texture Samples 337, 336, 335, 334, 333, 332, 331, and 330 are read in the following order: texels for Texture Samples 330 in a first clock cycle, texels for Texture Samples 331 in a second clock cycle, texels for Texture Samples 332 in a third clock cycle, texels for Texture Samples 333 in a fourth clock cycle, texels for Texture Samples 334 in a fifth clock cycle, texels for Texture Samples 335 in a sixth clock cycle, texels for Texture Samples 336 in a seventh clock cycle, and texels for Texture Samples 337 in an eighth clock cycle.

FIG. 3E illustrates an embodiment of a method of ordering reads of texels for texture samples for use in an anisotropic texture map filtering computation in accordance with one or more aspects of the present invention. The anisotropic ratio is used to determine the number of texture samples that are filtered to produce each filtered result. In FIG. 3E, the level of anisotropy is 3:1, so texels for three texture samples are read for each of Pixel 300, 301, 302, and 303. In one embodiment of the present invention, texels for Texture Samples 350, 351, 352, 353, 354, 355, 356, 357, 358, 359, 360, and 361 are read starting at one end of the major axis of anisotropy in texture space and ending at the opposing end of the major axis of anisotropy. Specifically, texels for texture samples are read in the following order: texels for Texture Samples 350, 351, 356, and 357 in a first clock cycle, texels for Texture Samples 352, 353, 358, and 359 in a second clock cycle, and texels for Texture Samples 354, 355, 360, and 361 in a third clock cycle.

In another embodiment of the present invention, texels for texture samples are read starting from the center of the major axis of anisotropy in texture space to one end of the major axis of anisotropy, returning to the center and ending at the opposing end of the major axis of anisotropy. Specifically, texels for texture samples are read in the following order: texels for Texture Samples 352, 353, 358, and 359 in a first clock cycle, texels for Texture Samples 350, 351, 356, and 357 in a second clock cycle, and texels for Texture Samples 354, 355, 360, and 361 in a third clock cycle. In alternate embodiments of the present invention, texels for a smaller or larger number of texture samples are read during a single clock cycle, dependent on the number of read ports on the texel cache. Persons skilled in the art will recognize that texel reads for other anisotropic ratios, such as 6:1, 10:1, 12:1, 14:1, 15:1, and the like, may be reordered in a similar manner.

FIG. 3F illustrates another arrangement of the four pixels, Pixels 300, 301, 302, and 303, in accordance with one or more aspects of the present invention. Pixels 300 and 301 and Pixels 302 and 303 are aligned along the x axis in pixel space and Pixels 300 and 302 and Pixels 301 and 303 are aligned along the y axis in pixel space, so the four pixels are rotated 90 degrees counter-clockwise relative to the same pixels shown in FIG. 3A. Therefore, as in FIG. 3A, the u axis in texture space is aligned with the x axis in pixel space and the v axis in texture space is aligned with the y axis in pixel space. The major axis of anisotropy is the v axis in texture space whereas, in FIG. 3A, the major axis of anisotropy is the u axis. Rather than pairing Pixel 300 with Pixel 302 for processing as in FIGS. 3B, 3C, and 3D, Pixel 300 is paired with Pixel 301 for processing.

When the major axis of anisotropy in texture space is more closely aligned with the u axis of the texture map, a major axis alignment is the u axis in texture space and texels are read for pairs of pixels that are aligned with the y axis in pixel space, such as Pixels 300 and 302 or Pixels 301 and 303. The major axis of anisotropy in texture space is more closely aligned with the u axis when the greater of the absolute value of du/dx and the absolute value of du/dy is greater than or equal to the greater of the absolute value of dv/dx and the absolute value of dv/dy. When the major axis alignment is the v axis texels are read for pairs of pixels that are aligned with the minor axis of anisotropy in texture space, i.e., pixels that are horizontally aligned, i.e., aligned along an x axis, in pixel space, such as Pixels 300 and 301 or Pixels 302 and 303.

FIG. 3G illustrates another embodiment of a method of ordering reads of texels for texture samples for use in an anisotropic texture map filtering computation in accordance with one or more aspects of the present invention. In FIG. 3G, the level of anisotropy is 8:1, so texels for eight texture samples are read for each of Pixel 300, 301, 302, and 303. Groups of texels for texture samples are read for pixel pairs that are aligned along the x axis in pixel space, such as Pixels 301 and 300 or Pixel 303 and 302. In one embodiment of the present invention, pairs of groups of texels for Texture Samples 347, 346, 345, 344, 343, 342, 341, and 340 are read starting at one end of the major axis of anisotropy in texture space and ending at the opposing end of the major axis of anisotropy.

Specifically, texels for Texture Samples 347, 346, 345, 344, 343, 342, 341, and 340 are read in the following order: texels for Texture Samples 347 in a first clock cycle, texels for Texture Samples 346 in a second clock cycle, texels for Texture Samples 345 in a third clock cycle, texels for Texture Samples 344 in a fourth clock cycle, texels for Texture Samples 343 in a fifth clock cycle, texels for Texture Samples 342 in a sixth clock cycle, texels for Texture Samples 341 in a seventh clock cycle, and texels for Texture Samples 340 in an eighth clock cycle. If texels for texture samples are read in the order used to read texels for texture samples shown in FIG. 3D, pairing Pixel 300 with Pixel 302 texel cache locality decreases.

Specifically, reading texels for four adjoining texture samples within Pixel 300 and Pixel 301, e.g., samples 347, may require accessing 1 to 4 cache lines. When texels for four texture samples that are further apart are read without reordering, such as texture samples 347 within Pixel 301 and texture samples 340 within Pixel 303, up to 8 cache lines may need to be accessed. Thus, reorganizing texel reads based on the major axis of anisotropy in texture space improves texel cache locality, reducing the number of clock cycles needed to read the texels for texture samples needed to produce each anisotropically filtered pixel, thereby improving texture filtering performance. Note that the texture filtering performance may be improved while the filtered result is equal to the filtered result that is obtained without reordering.

In another embodiment of the present invention, texels for pairs of groups of Texture Samples 347, 346, 345, 344, 343, 342, 341, and 340 are read starting from the center of the major axis of anisotropy in texture space to one end of the major axis of anisotropy, returning to the center and ending at the opposing end of the major axis of anisotropy. Specifically, texels for Texture Samples 347, 346, 345, 344, 343, 342, 341, and 340 are read in the following order: texels for Texture Samples 340 in a first clock cycle, texels for Texture Samples 341 in a second clock cycle, texels for Texture Samples 342 in a third clock cycle, texels for Texture Samples 343 in a fourth clock cycle, texels for Texture Samples 344 in a fifth clock cycle, texels for Texture Samples 345 in a sixth clock cycle, texels for Texture Samples 346 in a seventh clock cycle, and texels for Texture Samples 347 in an eighth clock cycle.

FIG. 4 is a block diagram of an embodiment of Texture Unit 170, shown in FIG. 1, in accordance with one or more aspects of the present invention. In some embodiments, Texture Unit 170 receives data from Rasterizer 150, e.g., program instructions, and parameters associated with fragments (texture IDs, texture coordinates such as s and t, and the like). A fragment is formed by the intersection of a pixel and a primitive. Primitives include geometry, such as points, lines, triangles, quadrilaterals, meshes, surfaces, and the like. A fragment may cover a pixel or a portion of a pixel. Likewise, a pixel may include one or more fragments.

Texture Unit 400 includes an Anisotropic Unit 405. A Control Unit 420 within Anisotropic Unit 405 processes the program instructions. Parameters produced by Rasterizer 150, e.g., texture map parameters, are received by a Derivative Computation Unit 410 within Anisotropic Unit 405. Derivative Computation Unit 410 computes derivative values, e.g., du/dx, du/dy, dv/dx, and dv/dy, as previously described in conjunction with FIG. 3A. Derivative Computation Unit 410 also computes the level of anisotropy (anisotropic ratio) and determines if the major axis of anisotropy in texture space is more closely aligned with the u axis or with the v axis, i.e., determines the major axis alignment. Derivative Computation Unit 410 outputs the anisotropic ratio, derivative values, and the major axis alignment (u or v) to a Sample Location Unit 425.

Sample Location Unit 425 determines a number of texture samples to filter based the anisotropic ratio. Sample Location Unit 425 also determines the locations, e.g., texture coordinates, of the number of texture samples. Specifically, the locations for the texture samples for a pixel with texture parameters u and v are computed as:

$$\text{sample}_{(anisotropic\ ratio-n)}(u,v) = (u+(n+0.5)du, v+(n+0.5)dv)\ \text{and}$$

$$\text{sample}_n(u,v) = (u+(n-0.5)du, v+(n-0.5)dv)$$

for n ranging from 0 to half the number of anisotropic samples. du is du/dx and dv is dv/dx when the major axis is more closely aligned with the x axis and du is du/dy and dv is dv/dy when the major axis is more closely aligned with the y axis.

Sample Location Unit 425 also computes additional sample locations based on the isotropic filtering, e.g., point sample, bilinear, trilinear, or the like, used to filter texels read from a Texel Cache 280 to compute each texture sample. Sample Location Unit 425 computes weights, using techniques known to those skilled in the art, for use during filtering of the texture samples to produce a filtered result.

Sample Location Unit 425 outputs the weights, major axis alignment, and sample locations to Ordering Unit 435. Ordering Unit 425 receives the major axis alignment computed by Derivative Computation Unit 410 and selects the order for reading texels for the number of texture samples, pairing texel reads for texture samples within pixels aligned along the x axis when major axis alignment is along the v axis and pairing texel reads for texture samples within pixels aligned with the y axis when major axis alignment is along the u axis, as previously described.

Ordering Unit 435 outputs the weights and the sample locations, in the order determined based on the major axis alignment, to an Address Computation Unit 450. Address Computation Unit 450 uses texture parameters (texture ID, and the like) received by Texture Unit 400 to determine addresses for reading texels for texture samples from memory via Texel Cache 480. Address Computation Unit 450 outputs the addresses to a Read Interface 460. Read Interface 460 outputs the addresses and a read request to Texel Cache 480. When a texel is not available in Texel Cache 480, Texel Cache 480 replaces a cache line with data read from memory that includes the texel.

In some embodiments of the present invention, Texel Cache 480 is configured to read up to four cache lines in a clock cycle. Therefore, when texel reads are ordered based on the major axis alignment and locality is increased, the texels needed to perform anisotropic filtering may be read in fewer clock cycles, thereby improving performance.

Texels read from Texel Cache 480 are received from the memory by a Texture Filter Unit 470. Texture Filter Unit 470 optionally performs isotropic filtering to compute each texture sample using the texels read for each texture sample. Texture Filter Unit 470 receives the weights from Address Computation Unit 450 and filters the texture samples using bilinear interpolation, trilinear interpolation, or anisotropic filtering to produce filtered results. Texture Filter Unit 470 also receives the major axis alignment in order to reorder the texels for texture samples as needed prior to processing them. The filtered results are output to a shader unit within Fragment Shader 155, to compute a color for each fragment. In some embodiments of the present invention Texture Filter Unit 470 processes texels and texture samples for two or more pixels in parallel.

FIG. 5 illustrates an embodiment of a method of reordering reads of texels for texture samples for use in an anisotropic texture map filtering computation in accordance with one or more aspects of the present invention. In step 505 Derivative Computation Unit 410 computes derivative values for two or more pixels. In step 510 Derivative Computation Unit 410 computes the anisotropic ratio and determines if the major axis of anisotropy in texture space is more closely aligned with the u axis or with the v axis. Derivative Computation Unit 410 outputs the major axis of anisotropy and the anisotropic ratio to Sample Location Unit 425. Sample Location Unit 425 determines the locations of the texture samples and in step 515, Ordering Unit 435 determines if the major axis of anisotropy is more closely aligned with the u axis. If, in step 515 Ordering Unit 435 determines the major axis alignment is the u axis, then in step 525 and Ordering Unit 435 organizes the texture sampling order pairing texels reads for texture samples within pixels that are aligned with the y axis in pixel space.

If, in step 515 Ordering Unit 435 determines the major axis alignment is not the u axis, i.e., the major axis alignment is the v axis, then in step 520 Sample Location and Ordering Unit 435 organizes the texture sampling order pairing texel reads for textures samples within pixels that are aligned with the x axis in pixel space.

In step 530 Ordering Unit 435 outputs the texture sample locations, ordered based on the major axis alignment, to Address Computation Unit 450. Address Computation Unit 450 computes addresses for the texture sample locations and outputs the addresses and read requests for texels, in the order specified by Ordering Unit 435, to read Interface 460. Read Interface 460 outputs the read requests and addresses to Texel Cache 480 and in step 530 the texels are output by Texel Cache 480 to Texture Filter Unit 470.

In step 535 Texture Filter Unit 470 reorders the texels as needed to process them. In some embodiments of the present invention, Texture Filter Unit 470 reverses the ordering specified by Ordering Unit 435 in step 520 or step 525 and processes two or more pixels in parallel. Step 535 may be omitted in some embodiments of the present invention. In step 540 Texture Filter Unit 470 processes the texels to produce filtered results for two or more pixels in parallel.

FIG. 6A is another conceptual diagram of a Texture Map 201. A Footprint 615 is a pixel footprint in texture space, with a Position 635 being the pixel center. FIG. 6B illustrates Texture Map 201 applied to pixels of a Surface 640 that is receding in image space. When viewed in image space, Footprint 615 (an ellipse) appears as Footprint 616 (a circle).

FIG. 6C illustrates Footprint 615 including a Minor Axis 625 that is significantly shorter than a Major Axis 630. Minor Axis 625 corresponds to the u texture coordinate axis and Major Axis 630 corresponds to the v texture coordinate axis. Texture Map 201 is rotated 90 degrees counter-clockwise when applied to Surface 640, therefore the x axis in pixel space is aligned with the v axis in texture space and the y axis in pixel space is aligned with the u axis in texture space. Likewise, Major Axis 630 corresponds to the x coordinate axis in pixel space and Minor Axis 625 corresponds to the y coordinate axis in pixel space.

Using the embodiment of the present invention described in conjunction FIG. 3G, where the major axis of anisotropy in texture space is aligned with the v axis, texels for texture samples within pixels that are aligned along the x axis in pixel space would be read in parallel. However, FIG. 6D illustrates another embodiment of a method of ordering reads of texels for use in an anisotropic texture map filtering computation in accordance with one or more aspects of the present invention.

In FIG. 6D, the level of anisotropy is 4:1, so texels for four texture samples are read for each of Pixel 300, 301, 302, and 303. Instead of reading texels for texture samples within pixels that are aligned with the x axis in pixel space, texture samples are reorganized based on the major axis of anisotropy in pixel space rather than the major axis of anisotropy in texture space. For example, texels are read in parallel for texture samples within pixels aligned with the y axis, such as, Pixels 300 and 302 or Pixels 301 and 303. Likewise, when the major axis of anisotropy in pixel space is more closely aligned with the y axis, the texels are read in parallel for texture samples within pixels that are aligned with the x axis in pixel space.

The major axis of anisotropy in pixel space is more closely aligned with the x axis, and the major axis alignment is the x axis, when the following condition is met:

$$|P1.uv-P0.uv|>|P2.uv-P0.uv|,$$

where |P1.uv−P0.uv| is the length of the derivative vector of texture map parameters u and v with respect to x. Likewise, |P2.uv−P0.uv| is the length of the derivative vector of texture map parameters u and v with respect to y.

Specifically, in one embodiment of the present invention, texels for pairs of groups of Texture Samples 610, 611, 612, and 613 are read starting from the center of the major axis of anisotropy in texture space to one end of the major axis of anisotropy, returning to the center and ending at the opposing end of the major axis of anisotropy. Specifically, texels for Texture Samples 610, 611, 612, and 613 are read in the following order: texels for Texture Samples 613 in a first clock cycle, texels for Texture Samples 612 in a second clock cycle, texels for Texture Samples 611 in a third clock cycle, and texels for Texture Samples 610 in a fourth clock cycle.

In another embodiment of the present invention, texels for pairs of groups of Textures Samples 610, 611, 612, and 613 are read starting at one end of the major axis of anisotropy in texture space and ending at the opposing end of the major axis of anisotropy. Specifically, texels for Texture Samples 610, 611, 612, and 613 are read in the following order: texels for Texture Samples 611 in a first clock cycle, texels for Texture Samples 610 in a second clock cycle, texels for Texture Samples 612 in a third clock cycle, and texels for Texture Samples 613 in a fourth clock cycle. In alternate embodiments of the present invention, texels for a smaller or larger number of texture samples are read during a single clock cycle, dependent on the number of read ports on Texel Cache 480.

FIG. 7 illustrates another embodiment of a method of reordering reads of texels for use in an anisotropic texture map filtering computation in accordance with one or more aspects of the present invention. In step 705 Derivative Computation Unit 410 computes du and dv for two or more pixels. In step 710 Derivative Computation Unit 410 computes the anisotropic ratio and determines if the major axis of anisotropy in texture space is more closely aligned with the x axis or with the y axis. Derivative Computation Unit 410 outputs the major axis of anisotropy and the anisotropic ratio to Sample Location Unit 425. Sample Location Unit 425 determines the locations of the texture samples and in step 715, Ordering Unit 435 determines if the major axis alignment is the x axis. If, in step 715 Ordering Unit 435 determines the major axis alignment is the x axis, then in step 725 and Ordering Unit 435 organizes the texture sampling order pairing texel reads for texture samples within pixels that are aligned with the y axis in pixel space.

If, in step 715 Ordering Unit 435 determines the major axis alignment is not the x axis, i.e., the major axis alignment is the y axis, then in step 520 Sample Location and Ordering Unit 435 organizes the texture sampling order pairing texel reads for texture samples within pixels that are aligned with the x axis in pixel space. Steps 730, 735, and 740 are completed as previously described in conjunction with steps 530, 535, and 540 of FIG. 5, respectively.

The invention has been described above with reference to specific embodiments. Persons skilled in the art will recognize, however, that various modifications and changes may be made thereto without departing from the broader spirit and scope of the invention as set forth in the appended claims. The foregoing description and drawings are, accordingly, to be regarded in an illustrative rather than a restrictive sense. The listing of steps in method claims do not imply performing the steps in any particular order, unless explicitly stated in the claim.

The invention claimed is:

1. A method of reorganizing texture sampling order for anisotropic texture map filtering, comprising:
   determining a major axis alignment for an anisotmpic footprint of a pixel in the texture map;
   determining a texture sampling order for texture samples based on the major axis alignment;
   reading texels for the texture samples from a texel cache based on the texture sampling order; and
   filtering the texels for the texture samples to produce an anisotropically filtered result for the pixel.

2. The method of claim 1, further comprising a step of reordering the texels for the texture samples prior to filtering the texels for the texture samples.

3. The method of claim 1, wherein the texture sampling order pairs groups of the texture samples that are aligned with a minor axis of anisotropy in texture space when the major axis alignment is a u axis in the texture space.

4. The method of claim 1, wherein the texture sampling order pairs groups of the texture samples that are aligned along an x axis in pixel space when the major axis alignment is a v axis in texture space.

5. The method of claim 1, wherein the texture sampling order pairs groups of the texture samples that are used to compute a filtered result for a first pixel and a filtered result for a second pixel.

6. The method of claim 1, wherein the texture sampling order pairs groups of the texture samples that are aligned with a y axis in pixel space when the major axis alignment is a x axis in the pixel space.

7. The method of claim 1, wherein the texture sampling order pairs groups of the texture samples that are aligned with an x axis in pixel space w hen the major axis alignment is a y axis in the pixel space.

8. The method of claim 1, wherein the determining of the major axis alignment includes computing a magnitude of a first texture coordinate vector relative to an x axis in pixel space and a magnitude of a second texture coordinate vector relative to a y axis in the pixel space.

9. The method of claim 1, wherein the texture sampling order specifies a sequence of pairs of groups of the texture samples starting at one end of an axis in texture space corresponding to the major axis alignment and ending at an opposing end of the axis in texture space.

10. The method of claim 1, wherein the texture sampling order specifies a sequence of pairs of groups of the texture samples starting from a center of an axis in texture space corresponding to the major axis alignment and proceeding to an end of the axis in the texture space and restarting from the center of the axis in the texture space and ending at an opposing end of the axis in the texture space.

11. The method of claim 1, further comprising the step of determining bilinear tap locations for each of the texture samples to determine additional texture sample locations.

12. A texture unit for determining a texture sampling order for anisotropic texture filtering, comprising:
    a derivative computation unit configured to compute a major axis alignment and an anisotropic ratio for an anisotropic footprint;
    a sample location unit configured to produce a number of sample locations and weights for texture samples based on the anisotropic ratio; and an ordering unit configured to determine the texture sampling order for reading texels for the texture samples based on the major axis alignment.

13. The texture unit of claim 12, further comprising a texels cache configured to store at least a portion of the texels for the texture samples and output the texels for the texture samples in the texture sampling order.

14. The texture unit of claim 13, wherein the texel cache is configured to output at least two cache lines in a single clock cycle.

15. The texture unit of claim 12, wherein the ordering unit is configured to determine the texture sampling order for reading the texels for the texture samples for at least two pixels in parallel.

16. The texture unit of claim 12, further comprising a texture filter unit configured to process the texels and weights and produce a filtered result for a pixel.

17. The texture unit of claim 12, wherein the major axis alignment is in pixel space.

18. The texture unit of claim 12, wherein the major axis alignment is in texture space.

19. The texture unit of claim 12, wherein the texture unit is included within a programmable graphics processor, the programmable graphics processor including a rasterizer that is configured to process primitives and generate fragment data including texture map parameters for output to the texture unit.

20. The texture unit of claim 12, wherein the sample location unit is configured to produce additional sample locations corresponding to texels to generate each texture sample.

21. The texture unit of claim 12, wherein the texture sampling order specifies a sequence of pairs of groups of the texture samples starting from a center of an axis in texture space corresponding to the major axis alignment and proceeding to an end of the axis in the texture space and restarting from the center of the axis in the texture space and ending at an opposing end of the axis in the texture space.

* * * * *

UNITED STATES PATENT AND TRADEMARK OFFICE
CERTIFICATE OF CORRECTION

| | |
|---|---|
| PATENT NO. | : 7,167,183 B1 |
| APPLICATION NO. | : 10/965069 |
| DATED | : January 23, 2007 |
| INVENTOR(S) | : Donovan et al. |

It is certified that error appears in the above-identified patent and that said Letters Patent is hereby corrected as shown below:

In column 14, line 9, replace "anisotmpic" with --anisotropic--

In column 14, line 38, replace "w hen" with --when--

Signed and Sealed this

Seventeenth Day of April, 2007

JON W. DUDAS
*Director of the United States Patent and Trademark Office*